(12) United States Patent
Carlin et al.

(10) Patent No.: US 6,199,341 B1
(45) Date of Patent: Mar. 13, 2001

(54) CONNECTION FOR A LIGHTWEIGHT STEEL FRAME SYSTEM

(75) Inventors: Barry J. Carlin, Winter Haven; David P. Green, Windemere; Richard H. Gustafson, Orlando, all of FL (US); Jay W. Larson, Bethlehem, PA (US)

(73) Assignees: Bethlehem Steel Corporation, DE (US); Steel Construction Systems, FL (US)

( * ) Notice: Subject to any disclaimer, the term of this patent is extended or adjusted under 35 U.S.C. 154(b) by 0 days.

(21) Appl. No.: 09/256,167

(22) Filed: Feb. 23, 1999

(51) Int. Cl.⁷ ..................................................... E04H 12/00
(52) U.S. Cl. ........................... 52/653.1; 52/93.1; 52/639; 52/653.2; 52/691; 52/745.21; 403/188
(58) Field of Search .......................... 52/93.1, 639, 653.1, 52/653.2, 691, 745.21; 403/188

(56) References Cited

U.S. PATENT DOCUMENTS

| | | |
|---|---|---|
| 1,787,167 | 12/1930 | Purdy . |
| 2,541,784 | 2/1951 | Shannon . |
| 2,642,825 | 1/1953 | McElhone et al. . |
| 3,332,179 | 7/1967 | Toti . |
| 3,474,578 | * 10/1969 | Wippermann .......................... 52/639 |
| 3,668,828 | * 6/1972 | Nicholas et al. .................... 52/639 X |
| 4,635,413 | 1/1987 | Hansen et al. . |
| 4,878,323 | 11/1989 | Nelson . |
| 4,986,052 | 1/1991 | Nelson . |
| 5,457,927 | 10/1995 | Pellock et al. . |
| 5,577,353 | 11/1996 | Simpson . |
| 5,746,039 | * 5/1998 | Nystrom ................................ 52/639 |
| 5,771,653 | * 6/1998 | Dolati et al. ...................... 52/93.1 X |
| 5,857,306 | 1/1999 | Pellock . |
| 5,865,008 | * 2/1999 | Larson ............................... 52/639 X |

OTHER PUBLICATIONS

Publication RG–934, Jun. 1993, Steel in Residential Construction Advisory Group, American Iron and Steel Institute.

* cited by examiner

Primary Examiner—Christopher T. Kent
(74) Attorney, Agent, or Firm—Harold I. Masteller, Jr.

(57) ABSTRACT

The invention is directed to a lightweight steel frame system having end nailed connections where lightweight steel structural members frame into support members. The end nailed connection is made by driving fasteners through the support member and directly into the connection end of a lightweight steel structural member without the need for using additional connection hardware. Where the lightweight steel structural member is a roof or floor truss, the support member may include a leveling member to facilitate positioning each roof truss at an elevation set point to produce a level roofline along the finished structure.

22 Claims, 9 Drawing Sheets

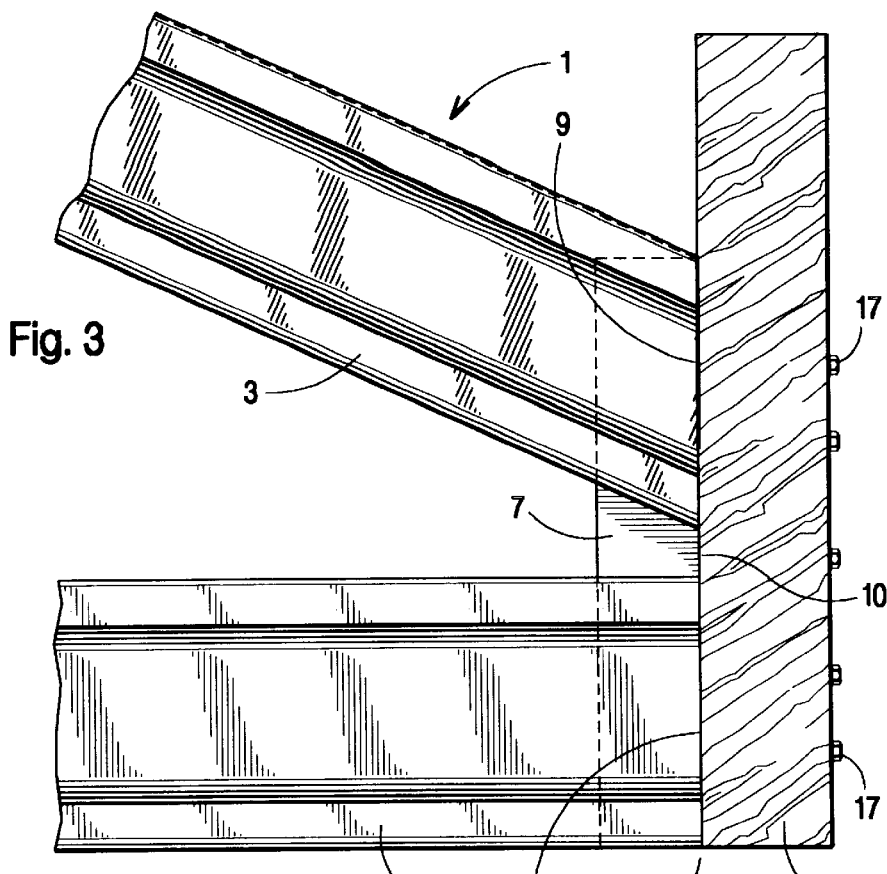
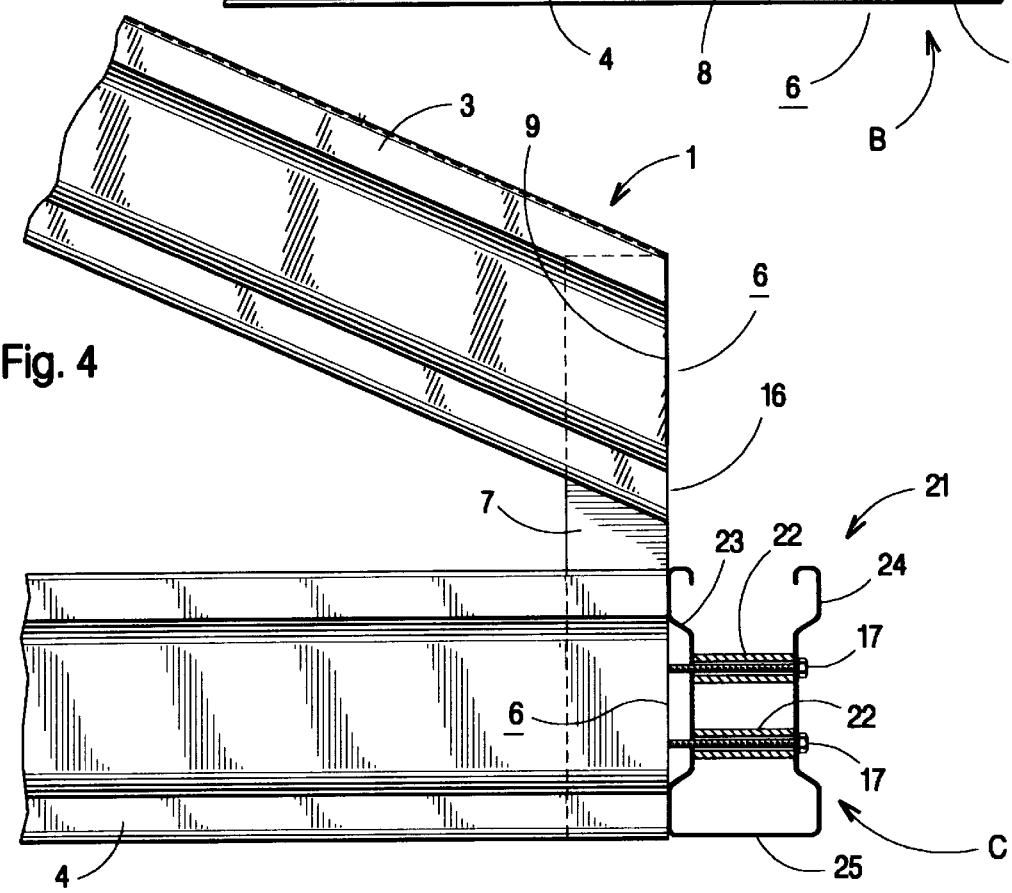

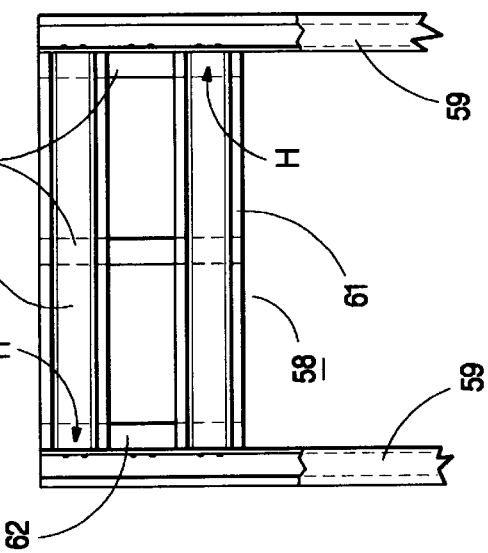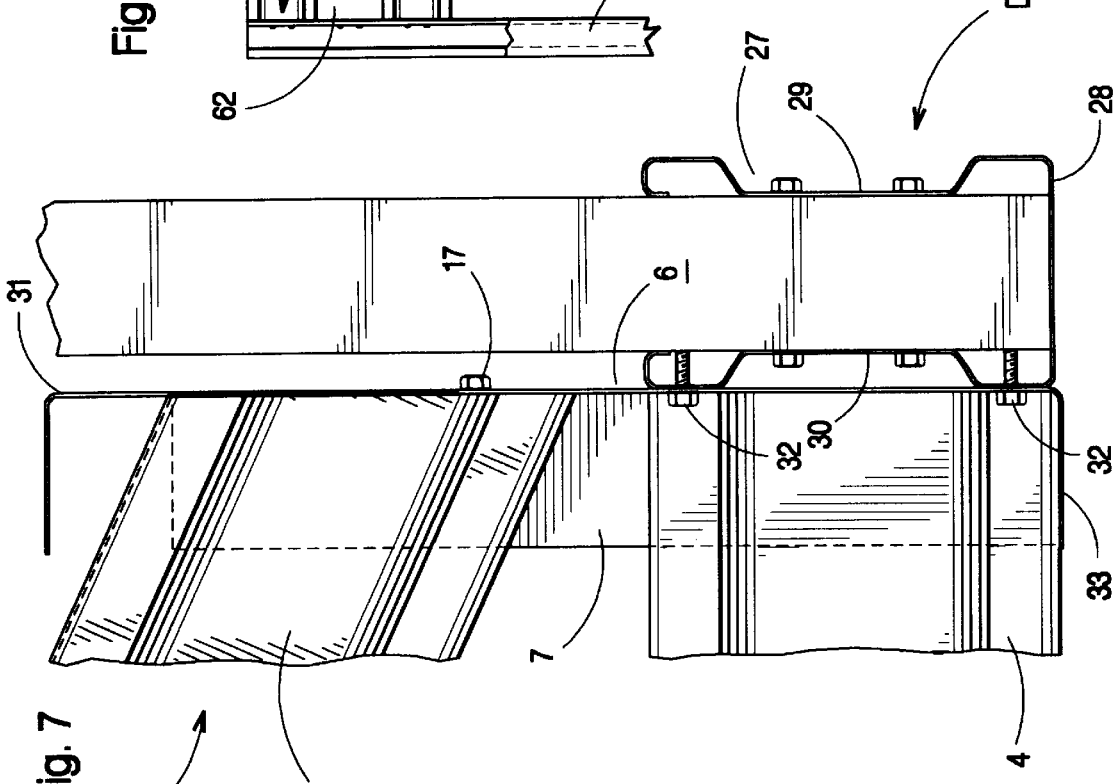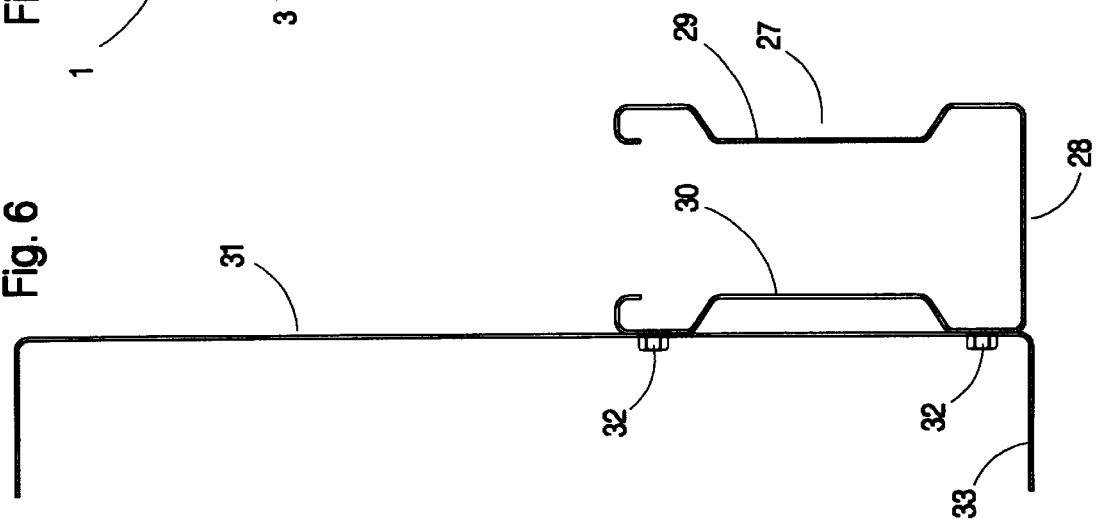

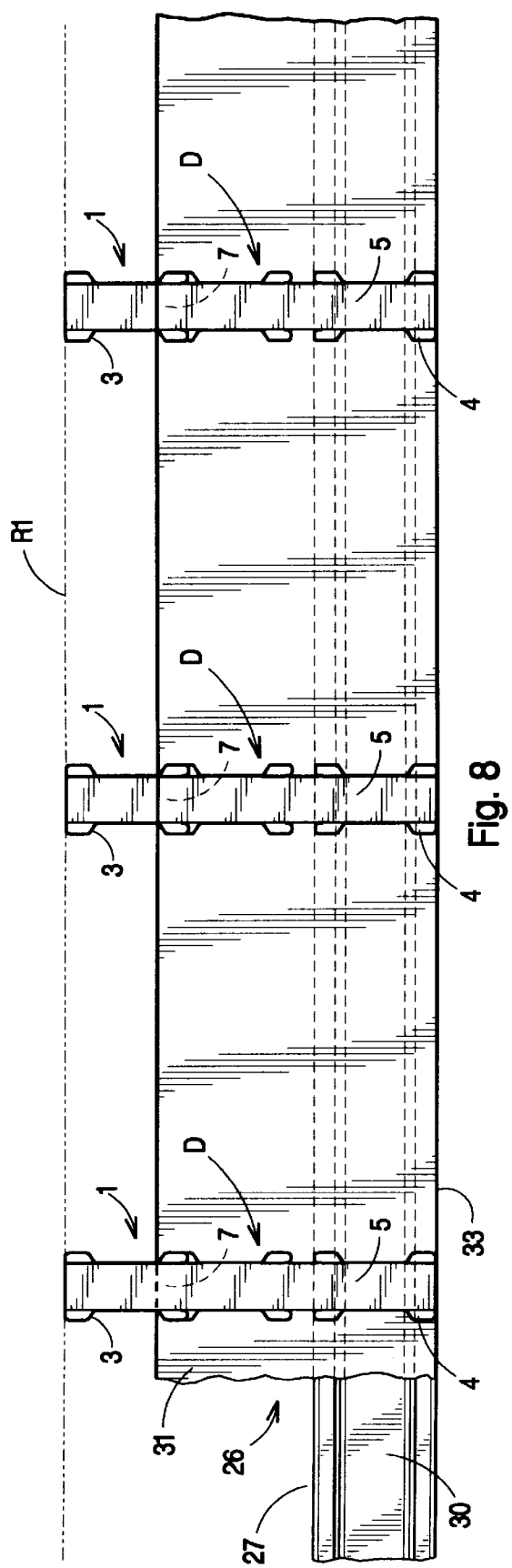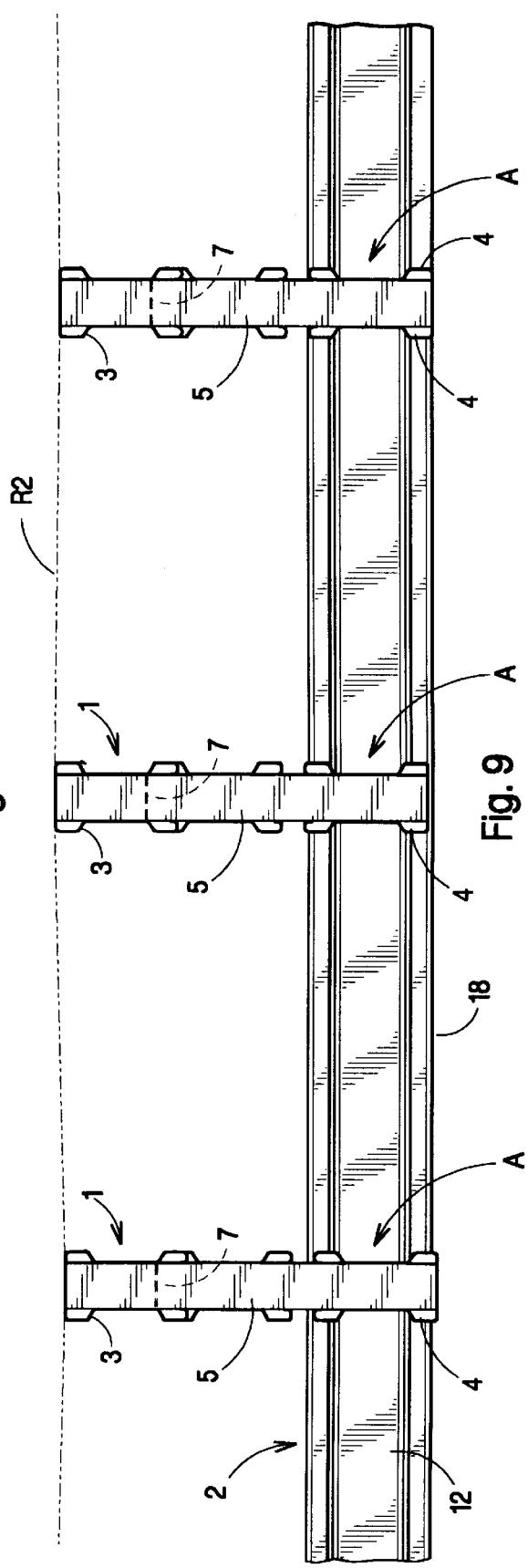

CONNECTION FOR A LIGHTWEIGHT STEEL FRAME SYSTEM

BACKGROUND OF THE INVENTION

This invention relates to lightweight steel frame construction for residential and commercial buildings, and in particular, this invention is directed to a lightweight steel frame system having end nailed shear connections where lightweight steel structural members frame into support members.

A long history has developed certain accepted framing practices for constructing wood structures. For example, wood roof truss systems are widely used throughout the framing industry because such systems simplify roof construction, and enable contractors to place a structure in progress under the protection of a roof more quickly. Additionally, a well designed roof truss system will, 1) reduce the need for inside bearing walls, 2) provide long spans that create large open interior spaces, and 3) reduce on-site labor costs associated with conventional rafter and joist roof frame type construction. Suppliers and designers typically manufacture roof truss systems from either solid wood and/or laminated materials, and more recently, such roof truss systems are manufactured with lightweight steel materials. In traditional wood framing, where wooden roof truss systems replace rafter and joist stick framing, designers recognize that certain framing connections are difficult to make due to the structural properties inherent in wood materials. For example, in a roof design where it is necessary to frame a series of wood roof truss members directly into a wood girder truss or support member, a shear connection is used. It is impractical to make such shear connections by driving fasteners through the support member and directly into the end grain of the roof truss (defined herein as "end nailing"). This is because end nailed shear connections in wood materials produce weak connections that will fail under load conditions. Therefore, framers have found that it is necessary to use connection hardware that enables a builder to direct nail the shear connections that attaches wood roof truss members to a support member. Direct nailing is defined in the "Glossary of Terms" published by the Wood Truss Council of America, as nailing (fastening) perpendicular to the member being nailed. Direct nailing practice has produced an vast array of various shaped connection hardware products that range from special hangers and angles to clips and other devices. Such connection hardware is very troublesome in the field and from a design viewpoint. To illustrate, clips and hangers complicate the load path from the roof truss to the foundation of the structure. The forces associated with such hanger connections are unpredictable and difficult to calculate. In the field, connection hardware adds extra framing parts, and increases labor costs.

Similar problems arise where builders use lightweight steel to frame an entire structure. In such instances, floor joists that shear connect into support members and walls and girders present the same framing problems as described above for roof truss systems. Likewise, where lightweight steel headers span openings such as doorways, windows, arches and the like, connection hardware must be used as heretofore described for the connections. Therefore, there is a long felt need within the construction industry to eliminate the need for using connection hardware when shear connecting roof truss members, joists, or headers that frame into support members such as girders and walls or the like.

SUMMARY OF THE INVENTION

It is therefore an object of this invention to provide an improved end nailed connection for assembling a lightweight steel frame system.

It is a further object of this invention to provide an improved end nailed connection for a lightweight steel roof truss member framing into a support member in a lightweight steel frame system.

It is also an object of this invention to provide an improved end nailed connection for a lightweight steel floor truss framing into a support member in a lightweight steel frame system.

It is also an object of this invention to provide an improved end nailed connection for a lightweight steel header framing into a support member in a lightweight steel frame system.

It is a further object of this invention to provide an improved end nailed connection that provides a more direct load from lightweight steel frame members into the foundation of a structure.

It is still another object of this invention to provide a connection for use in lightweight steel framing system that can be end nailed without connector hardware.

In satisfaction of the foregoing objects and advantages, the present invention provides a lightweight steel frame system having end nailed connections where lightweight steel structural members frame into support members. The end nailed connection is made by driving fasteners through the support member and directly into the connection end of a lightweight steel structural member without the need for using additional connection hardware. Where the lightweight steel structural member is a roof or floor truss, the support member can include a leveling member to facilitate positioning each roof or floor truss at an elevation set point to produce a level roofline or floor line along the finished structure.

BRIEF DESCRIPTION OF THE DRAWINGS

FIG. 3. is an end view similar to FIG. 2 showing the lightweight steel roof truss framing into a wood girder or into the bottom chord of a wood girder truss.

FIG. 4. is an end view similar to FIG. 2 showing an alternate spacer embodiment positioned between the legs of the lightweight steel girder truss.

FIG. 6. is an end view of the alternate lightweight steel girder truss embodiment shown in FIG. 5.

FIG. 7. is an end view similar to FIG. 6 showing a lightweight steel roof truss framing into the alternate lightweight steel girder truss.

FIG. 8. is an elevation view showing a plurality spaced apart lightweight steel roof truss members framing into the lightweight steel girder truss shown in FIGS. 5–7.

FIG. 9. is an elevation view similar to FIG. 8 without the lightweight steel girder truss embodiment shown in FIGS. 5–7.

FIG. 16. is an elevation view of the end nailed lightweight steel framing system of the present invention showing a lightweight steel header framing a lightweight steel support member.

DETAILED DESCRIPTION OF THE PREFERRED EMBODIMENT

A study of materials engineering as it relates to the construction industry will show that material applications appear to be evolving away from natural materials toward man made or recycled materials. Much of this activity is a result of a growing environmental awareness by manufacturers and customers. To illustrate, drywall is being manufactured with recycled paper, carpet is manufactured from collected soda bottles, roof shingles contain yesterday's plastic and paper waste, and wood frame construction material is being replaced with lightweight steel frame products that are manufactured by remelting scrap from appliances, automobiles and steel cans.

Lightweight steel frame products are becoming more popular with builders, and more popular with homeowners, because of the intrinsic properties of steel. Steel will support greater loads over longer spans than wood. Steel is more resistant to natural disasters such as hurricanes, tornadoes and earthquakes. Steel will not rot, and steel will not be destroyed by insects such as termites and carpenter ants. However, as heretofore mentioned, current steel frame practice and procedures require builders to carry along a vast array of hardware to make connections between structural members in the framing system. This practice might be partially due to old habits brought into the steel framing industry by workers schooled in wood frame construction. For example, roof truss systems are in wide use throughout the wood construction industry because truss systems simplify framing, and because they make possible creative architectural designs that could not be achieved with traditional rafter and joist construction. Such roof truss systems are typically constructed from either wood and/or wood laminate materials. The inherent properties of wood material makes it necessary for builders to direct nail (as defined above) their shear connections when framing a roof truss into a support member such as a girder truss. It is well known within the wood construction industry that end nailing directly into the end grain of a wood roof truss will produce a very weak connection that will fail under load. This well founded practice of direct nailing roof truss connections appears to be so entrenched within the framing industry that when new lightweight steel roof truss systems began to appear in the construction industry, architects and contractors alike failed to either recognize or develop new connection systems for use with the new steel materials. To illustrate, the Steel in Residential Construction Advisory Group of the American Iron and Steel Institute has released Publication RG-934, June 1993, entitled "Low Rise Residential Construction Details." In every instance, where the publication shows a joist, roof truss, or rafter framing into a support member, the recommended practice teaches using clips or angles to direct nail or direct fasten the connection in a manner similar to a wood frame connection.

Figure 1:
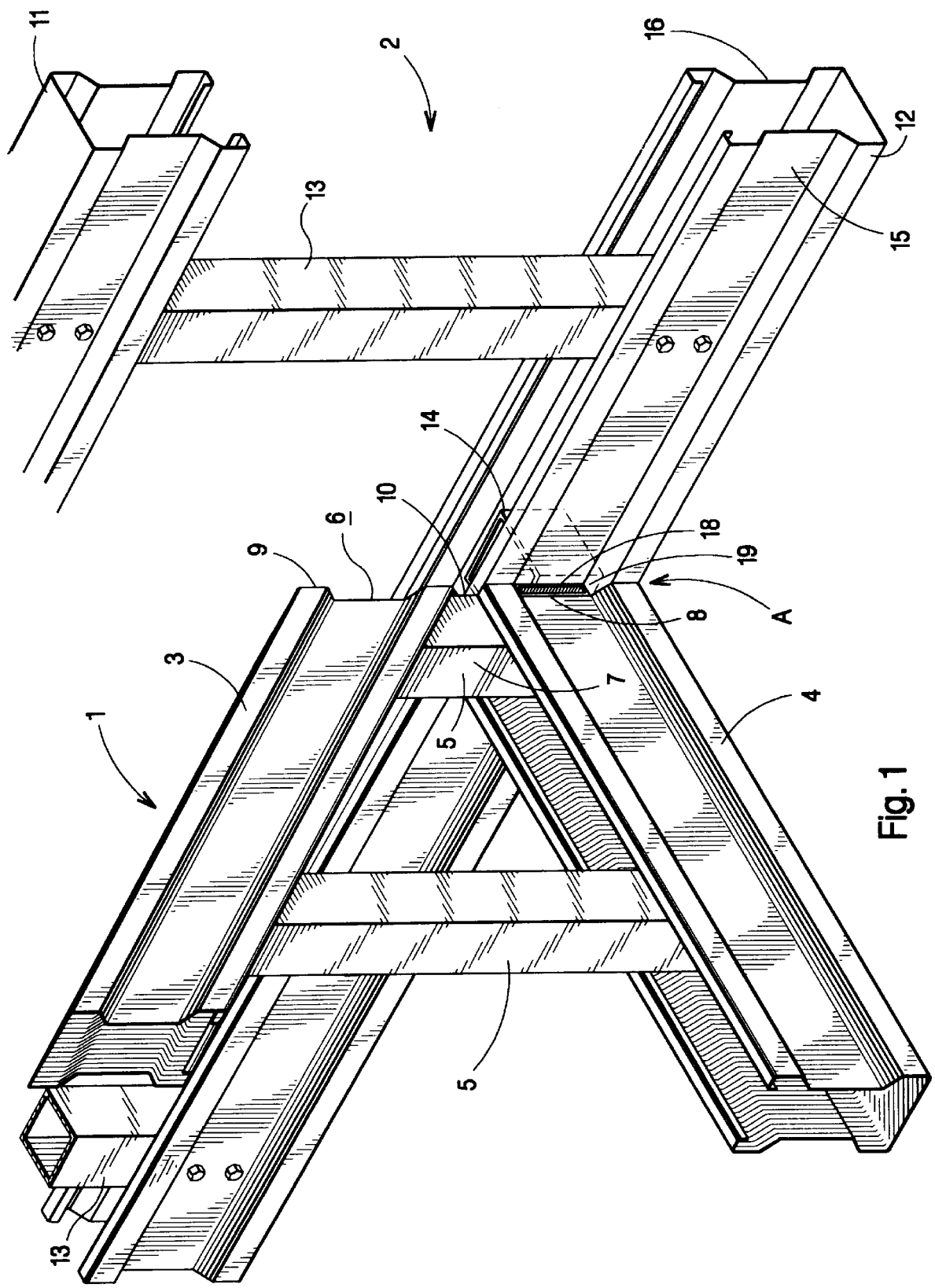
FIG. 1. is an isometric view of an end nailed lightweight steel framing system showing a steel roof truss framing into the bottom chord of a steel girder truss.
Figure 2:
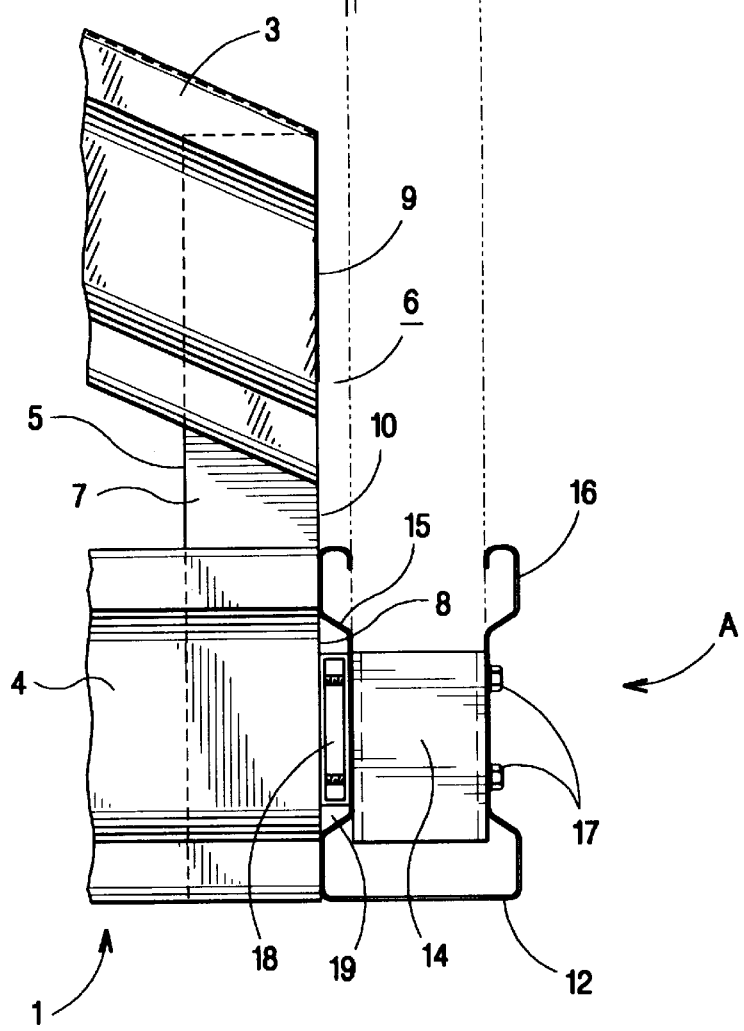
FIG. 2. is an end view of the lightweight steel framing system shown in FIG. 1.

Referring to FIGS. 1 and 2, the preferred embodiment of the present invention includes end nailed connections that fasten lightweight steel roof truss members to a support member in a lightweight steel frame system. The drawings show a lightweight steel roof truss member 1 framing into a lightweight steel support member 2 at a connection labeled "A." A typical lightweight steel roof truss member comprises a top truss chord 3, a bottom truss chord 4 and a plurality of spaced apart web members 5 that extend between the top truss chord and bottom truss chord. In the preferred embodiment, roof truss member 1 includes a connection end or butt end 6 and an end web member 7. End web member 7 extends between the top and bottom truss chords at a position adjacent end 8 of the bottom truss chord 4, and adjacent end 9 of the top truss chord 3 to locate side 10 of the end web member along butt end 6. Side 10 provides a fastening surface for connecting the lightweight steel roof truss member to the support member.

The preferred support member 2 comprises a lightweight steel girder truss that includes a top girder chord 11, a bottom girder chord 12 and a plurality of spaced apart webs 13 extending between the top and bottom girder chords along the length of support member 2. A spacer 14, shown more clearly in FIG. 2, is inserted between spaced apart legs 15 and 16 in the bottom girder chord 12 at a location adjacent connection "A", and an end nailed shear connection is made by driving fasteners 17, through the spaced apart legs 15 and 16, through spacer 14, and into the connection end 6 of the roof truss member 1. At least one spacer 14 is inserted between legs 15 and 16 to prevent the legs from being crushed or squeezed together when fasteners 17 are end nailed or screwed into the connection end 6 of the roof truss member. Although the drawing shows roof truss member 1 framing into leg 15 of the bottom girder chord, the roof truss member could just as well frame into leg 16 without departing from the scope of this invention. Additionally, fillers 18 may be inserted into any gaps or spaces 19 that are formed where connection end 6 of the truss member frames into the support member 2. Fillers 18 strengthen the connection and prevent crushing the legs at gaps 19 when the end nailed connections are made.

Referring to FIG. 3, an alternate lightweight steel roof truss arrangement is shown having an end nailed shear connection "B" where a lightweight steel roof truss member 1 frames into a wood support member 20. Roof truss member 1 includes a connection end 6 comprising an end web member 7 having a side 10 adjacent end 8 of the bottom roof truss chord 4, and adjacent end 9 of the top roof truss chord 3. Roof truss 1 is positioned to place the connection of butt end 6 against a selected location along one of the sides of the wood support member 20, and the end nailed connection "B" is made by driving fasteners 17 through support member 20 and into the connection end 6 of roof truss member 1.

Referring to FIG. 4, a lightweight steel roof truss 1 is shown end nailed at shear connection "C" framing into a lightweight steel girder 21 that includes an alternate spacer arrangement between the spaced apart legs 23 and 24 of the bottom girder chord 25. In this alternate embodiment, fasteners 17 extend through tubular spacers 22 that prevent crushing legs 23 and 24 when the end nailed shear connection "C" is made by driving fasteners 17, through the spaced apart chord legs 23 and 24, through respective tubular spacers 22, and into the connection end 6 of the roof truss member 1.

Figure 5:
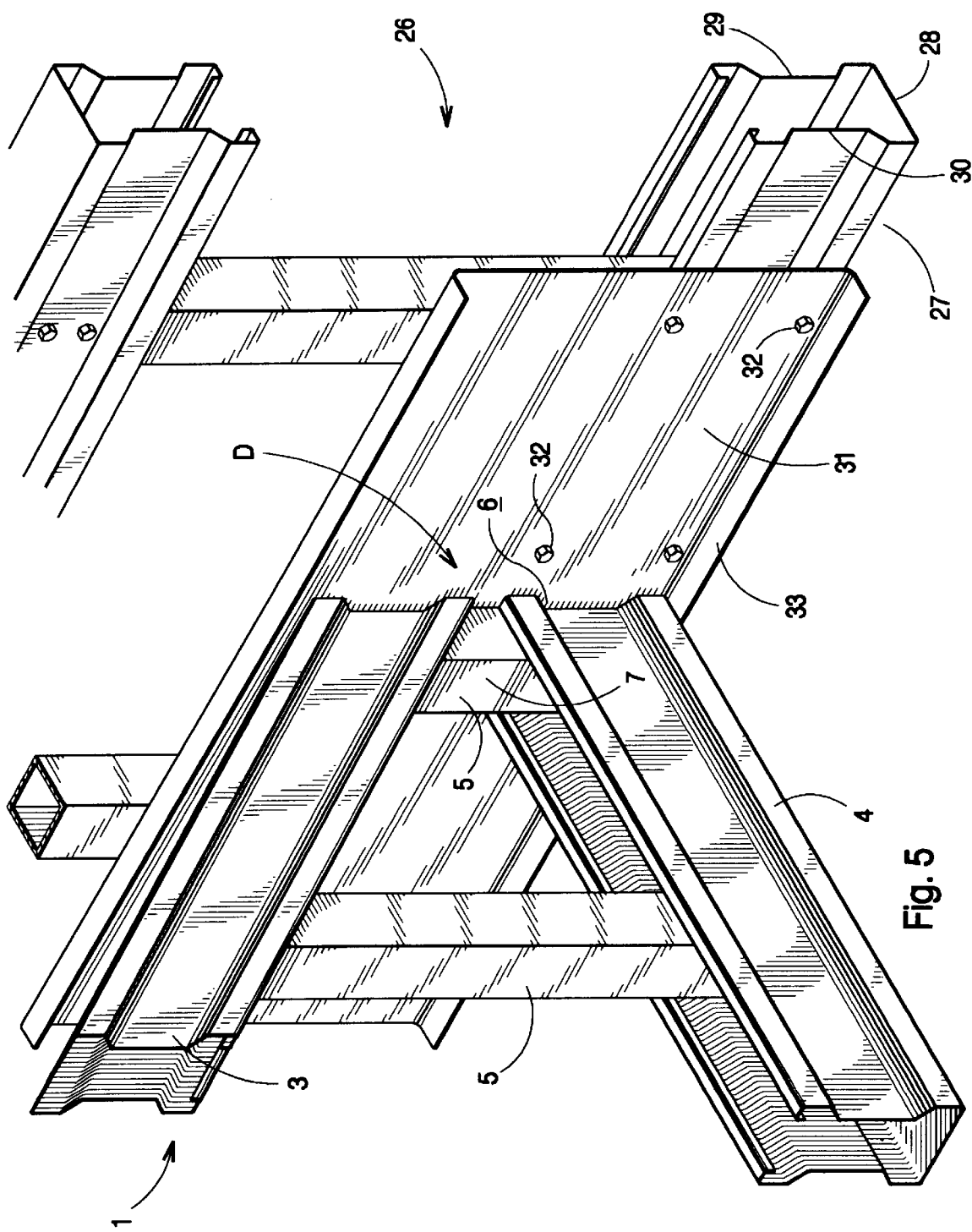
FIG. 5. is an isometric view similar to FIG. 1 showing an alternate lightweight steel girder truss embodiment.

FIGS. 5 through 7 show an end nailed shear connection embodiment "D" of the present invention being used in a lightweight frame system having an alternate lightweight steel girder embodiment 26. The alternate girder embodiment includes a bottom girder chord 27 comprising a horizontal segment 28 and spaced apart legs that extend in an upward direction from the horizontal segment. The spaced apart legs include a first leg 29 and a connection leg 30 that has a greater depth than the first leg. The increased depth in connection leg 30 provides a stiffer section for making the end nailed shear connections "D" and is manufactured by either roll forming a deeper leg, as disclosed in greater detail below, or by mechanically attaching a leg extension 31 to connection leg 30. The leg extension 31 may be attached with any suitable fastening means well known in the art, for example, spot welding, self tapping screws, bolts, crimping, or the like. In this instance, the drawings show using self tapping screws 32 to attach a lightweight steel channel section 31 to the connection leg 30 with the channel flanges toeing in an outward direction toward the incoming roof truss members 1. Channel 31 is positioned along connection leg 30 to provide a leveling member 33 for receiving incoming roof truss members. Leveling member 33 is positioned at a location that establishes a continuous elevation set point for the repeated framing connections "D" along the length of the lightweight steel girder. The incoming roof truss members framing into girder 26 are supported on leveling member 33, and the end nailed shear connections "D" are made by driving fasteners 17 through leg extension 31 and into the connection end 6 of the incoming lightweight steel roof truss member 1.

Leveling member 33 simplifies positioning a series of steel roof truss members at a consistent elevation set point to insure a level roofline along a finished structure. For example, referring to FIG. 8, the drawing shows a plurality of lightweight steel roof truss members 1 that are framed into the bottom chord member 27 of a lightweight steel girder 26. The girder includes a deep connection leg extension 31 and leveling member 33 for supporting the incoming roof truss members. Each lightweight steel roof truss member 1 includes a top chord 3, a bottom chord 4, and an end web member 7 positioned along the outside edge of the connection end. The roof truss members are placed on leveling member 33 and the end nailed shear connections "D" are made as disclosed above to attach the roof truss members 1 to girder 26. As clearly shown in the drawing, when leveling member 33 is positioned properly to provide a continuous elevation set point along the length of connection leg 30, the repeated framing connections "D" produce a level roof line R1 along the top chords 3 of the spaced apart roof truss members 1. Conversely, referring to FIG. 9, if leveling members 33 are not provided along the support member in a roof truss arrangement, it is more difficult for builders to frame a repeated elevation set point at the framing connections. FIG. 9 shows a plurality of lightweight steel roof truss members 1 framing into the bottom chord member 12 of a lightweight steel girder 2 similar to the configuration shown in FIGS. 1 and 2. In this instance, girder 2 does not include a leveling member 33 for supporting the incoming roof truss members 1. The roof truss members are placed along the bottom truss chord 12 at selected locations, and the end nailed shear connections "A" are made as disclosed above in the description for FIGS. 1 and 2. As clearly shown in the drawing, when the leveling member 33 is omitted, it is more difficult to place the repeated framing connections "A" at a consistent elevation set point. Consequently, an irregular roofline R2 is created along the top chords 3 of the spaced apart steel roof truss members.

Figure 10:
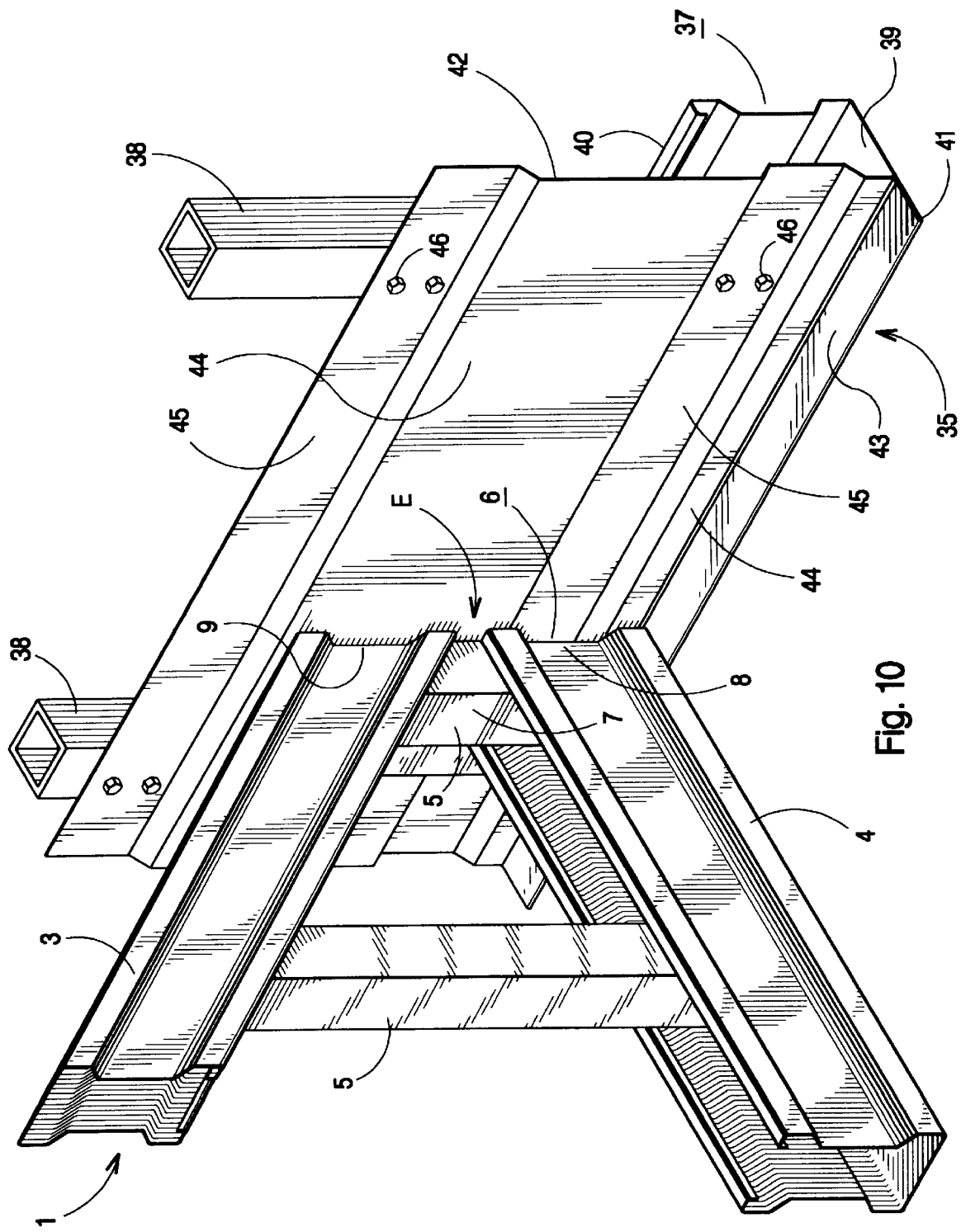
FIG. 10. is an isometric view similar to FIG. 1 showing a second alternate lightweight steel girder truss embodiment.
Figure 12:
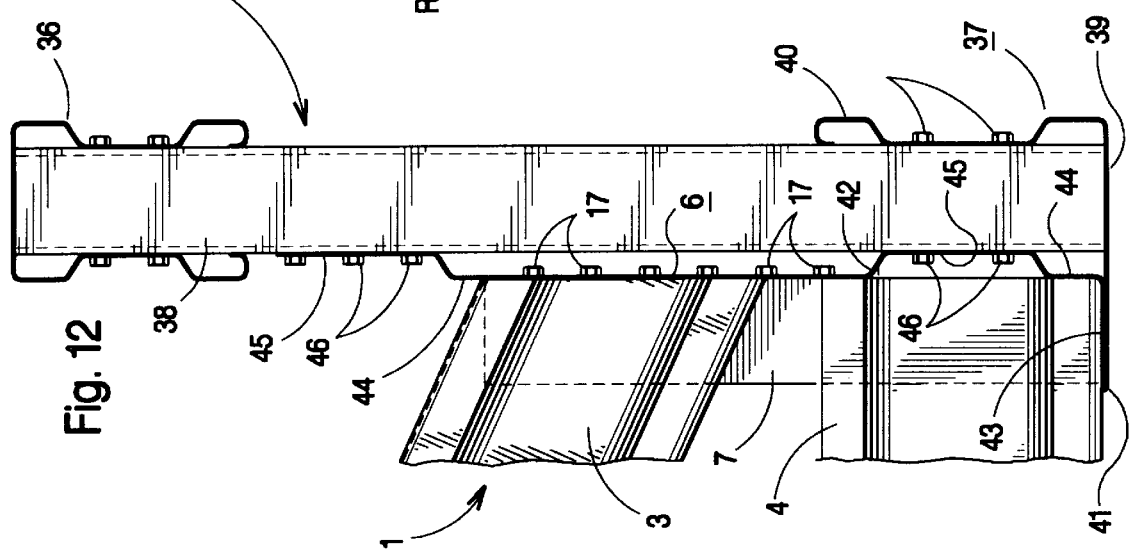
FIG. 12. is an end view similar to FIG. 11 showing a lightweight steel roof truss framing into the second alternate lightweight steel girder truss.
Figure 11:
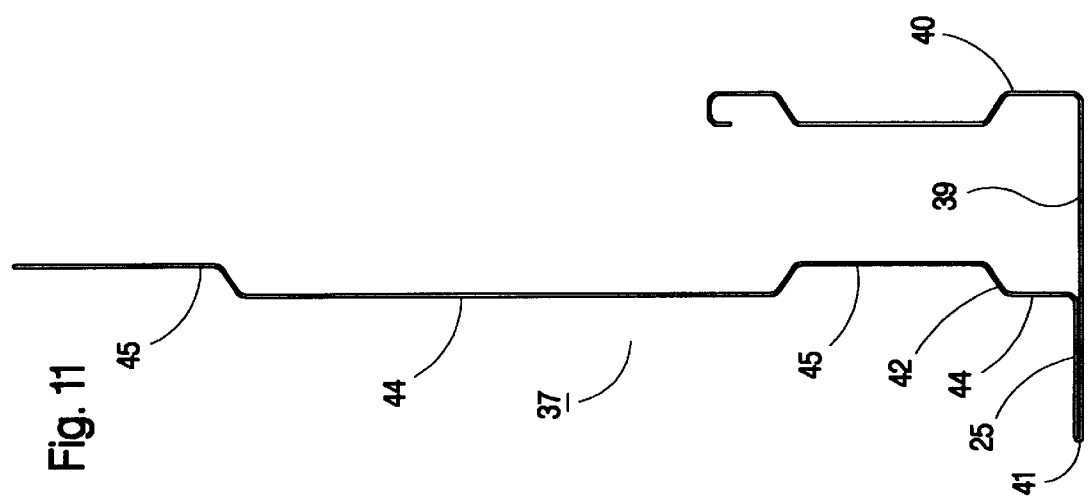
FIG. 11. is an end view of the second alternate lightweight steel girder truss embodiment shown in FIG. 10.

FIGS. 10 through 12 show an end nailed shear connection embodiment "E" of the present invention being used in a lightweight frame system that includes an alternate roll formed lightweight steel girder 35 having a deep connection leg. The lightweight steel girder 35 includes a top chord 36 (shown in FIG. 12), a bottom chord 37 and a plurality of spaced apart girder webs 38 extending between the top and bottom chord members. Bottom chord member 37 includes a horizontal segment 39 having a first leg 40 extending in an upward direction from the horizontal segment along the length of chord member 37, a hemmed edge 41 extending along the length of chord 37 opposite first leg 40. A connection leg 42, having a greater depth than first leg 40, extends in an upward direction from horizontal segment 39 at a location between the first leg and hemmed edge 41. The connection leg also extends along the length of bottom chord member 37. Connection 42 is deeper than first leg 40 to provide a stiffer section at the repeated connections "E" along the length of the girder, and the hemmed edge 41 provides a horizontal leveling member 43 that extends in an outward direction from the bottom girder chord 37 to receive incoming lightweight steel roof truss members 1 framing against connection leg 42. Connection leg 42 includes alternating, vertically juxtaposed, segments 44 and 45 that extend as flat surfaces along a length of leg 42. Segments 44 are positioned to engage the connection end 6 of roof truss members 1 framing against connection leg 42, and segments 45 are positioned to engage the spaced apart girder web members 38 that extend between the top girder chord 36 and the bottom girder chord 37 of the lightweight steel girder 35. The girder web members 38 are fastened to the top chord 36 and the bottom chord 37 by mechanical means, for example by driving self tapping screws 46, or the like through top girder chord 36 and into the web members 38. As more clearly shown in FIG. 12, the end nailed roof truss connections "E" are made wherever a roof truss member frames into girder 35 by driving self tapping screws 17 through segments 44 in the connection leg 42 and into the butt end 6 of the roof truss member framing into the connection leg.

Figure 13:
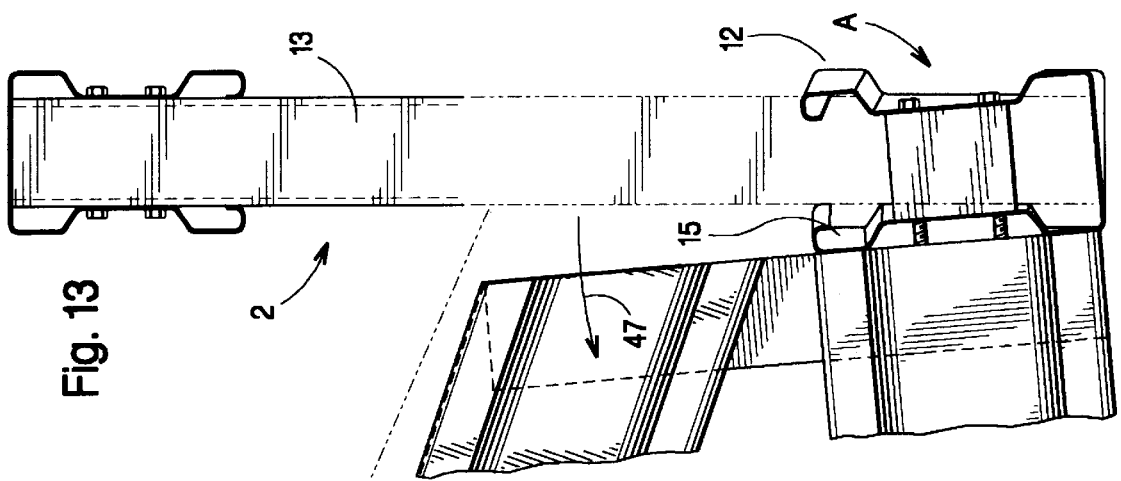
FIG. 13. is an end view showing a lightweight roof truss framing into the bottom chord of a lightweight girder truss.

As heretofore mentioned, the connection leg extension 31, and the deep roll formed connection leg 42, provide a stiffer connection leg section for making the end nailed shear connections of the present invention. Referring again to FIGS. 1, 5, and 8, end nailed connections are often made at a location that is distant from the girder webs extending between the top and bottom girder chords of a lightweight steel girder. In such instances, the load force generated at such connections tends to cause the attached girder chord portion to rotate and distort the roofline of the structure as illustrated in FIG. 13. Referring to FIG. 13, an end nailed connection "A" similar to FIG. 1 is shown attaching a lightweight steel roof truss member 1 to the bottom chord leg 15 of a lightweight steel girder chord 12. In this instance, framing connection "A" is positioned at a location about midpoint or less between spaced apart girder webs 13. At such unsupported locations, connections generate load forces that tend to rotate the chord section as shown by direction arrow 46. Such rotation causes chord 12 to twist and drop the roof truss member from a level R1 roofline position to a non-level R2 roofline position. A deeper connection leg section, as illustrated in FIGS. 5 and 10, provides additional stiffness along the leg and prevents rotation at such midpoint connections.

Figures 14, 15:
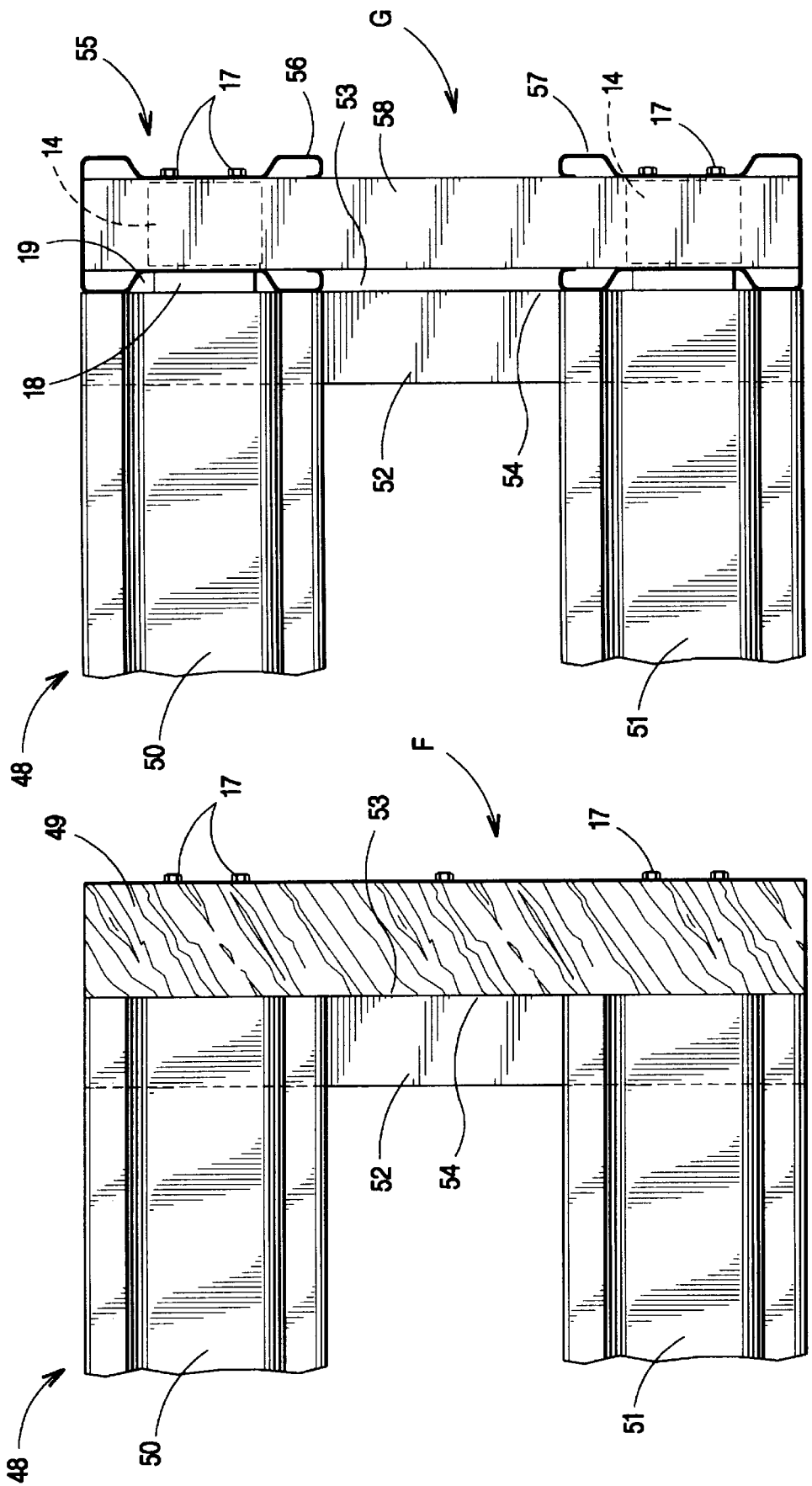
FIG. 14. is an elevation view of the end nailed lightweight steel framing system of the present invention showing a lightweight steel floor truss framing a wood support member.
FIG. 15. is an elevation view of the end nailed lightweight steel framing system of the present invention showing a lightweight steel floor truss framing a lightweight steel support member.

FIG. 14 shows an end nailed shear connection embodiment "F" of the present invention being used in a lightweight frame system that includes a lightweight floor truss 48 framing into a support member 49. The lightweight steel floor truss includes a top chord 50, a bottom chord 51, and a plurality of spaced apart web members 52 extending between the top and bottom chords along the length of the lightweight floor truss. Floor truss 48 includes a connection end 53, and one of the joist web members 52 is positioned to provide an end web member 52 that extends between the top and bottom chords 50 and 51 at a position adjacent connection end 53 to locate web side 54 along the connection end. Side 54 provides a fastening surface for connecting the lightweight steel floor truss member to the support member 49. The end nailed shear connection "F" is made by driving fasteners 17 through the support member and into the connection end 53 of the lightweight steel floor truss member.

FIG. 15 shows an end nailed shear connection embodiment "G" of the present invention being used in a lightweight frame system that includes a lightweight floor truss 48 framing into a lightweight steel support member 55. In this instance, the lightweight steel support member 55 includes a top support chord 56, a bottom support chord 57, and a plurality of spaced apart support web members 58 extending between the top and bottom support chords along the length of the lightweight steel support member. Support member 55 includes spacers 14 inserted between spaced apart legs in the top and bottom support member chords 56 and 57, and the end nailed connection "G" is made by driving fasteners 17 through the legs of chords 56 and 57, through the spacers 14 and into the connection end 53 of the incoming lightweight steel floor truss 48. Additional spacers 18 may be inserted into gaps 19 to strengthen the connection similar to the disclosure for FIG. 1.

FIG. 16 shows an end nailed shear connection embodiment "H" of the present invention being used in a lightweight frame system that includes a lightweight header 58 framing across an opening such as a window or doorway and into a lightweight steel framing members 59. Header 58 includes a top header chord 60, a bottom header chord 61, and spaced apart header web members 62, with two header web members 62 providing end web members positioned at opposite ends of the header assembly. In this instance, the end nailed connection "H" is made by driving fasteners through the lightweight steel studs and into the connection ends 59 of the header that includes an end web member 60 positioned along the connection ends 59 in a manner similar to the above framing member disclosures.

While this invention has been described as having a preferred design, it is understood that it is capable of further modifications, uses, and/or adaptations following in general the principle of the invention and including such departures from the present disclosure as come within known or customary practice in the art to which the invention pertains, and as may be applied to the essential features set forth herein, and fall within the scope of the invention limited by the appended claims.

We claim:

1. A method of making an end fastened connection to attach structural members in a lightweight steel frame system, the steps of the method comprising:
    a) providing a lightweight steel structural frame member having a top chord, a bottom chord and at least one connection end, said at least one connection end including a web member extending between said top chord and said bottom chord;
    b) positioning said lightweight steel structural frame member to abut said at least one connection end against a second structural frame member; and
    c) driving at least one fastener through the second structural frame member and directly into said web member, said at least one fastener providing an end fastened connection that attaches the lightweight steel structural frame member to the second structural frame member so that said second structural frame member supports said lightweight steel structural frame member.

2. The method according to claim 1 wherein the lightweight steel structural frame member is a lightweight steel roof truss.

3. The method according to claim 2 wherein the second structural frame member is a lightweight steel girder and the method for attaching the lightweight steel roof truss to the lightweight steel girder includes the further steps of:
    a) placing a spacer between spaced apart legs extending along a length of the lightweight steel girder;
    b) positioning said lightweight steel roof truss to abut said at least one connection end against one of said spaced apart legs so that said at least one connection end is positioned opposite said spacer; and
    c) driving at least one fastener through the spaced apart legs, through said spacer, and directly into said web member positioned opposite said spacer, said at least one fastener providing an end fastened connection that attaches the lightweight steel roof truss to the lightweight steel girder.

4. The method according to claim 1 wherein the lightweight steel structural frame member is a lightweight steel floor truss.

5. The method according to claim 4 wherein the second structural frame member is a lightweight steel girder and the method for attaching the lightweight steel floor truss to the lightweight steel girder includes the further steps of:
    a) placing a spacer between spaced apart legs extending along a length of the lightweight steel girder;
    b) positioning said lightweight steel floor truss member to abut said at least one connection end against one of said spaced apart legs so that said at least one connection end is positioned opposite said spacer; and
    c) driving at least one fastener through the spaced apart legs, through said spacer, and directly into said web member positioned opposite said spacer, said at least one fastener providing an end fastened connection that attaches the lightweight floor truss member to the lightweight steel girder.

6. The method according to claim 1 wherein the lightweight steel structural frame member is a lightweight steel header and the second structural frame member is a stud.

7. The method according to claim 6 wherein the stud is a lightweight steel stud and the method for attaching said lightweight steel header to the lightweight steel stud includes the further steps of:
    a) placing a spacer between spaced apart legs extending along a length of the lightweight steel stud;
    b) positioning said lightweight steel header to abut said at least one connection end against one of said spaced apart legs so that said at least one connection end is positioned opposite said spacer; and
    c) driving at least one fastener through the spaced apart legs, through said spacer, and directly into said web member to provide an end fastened connection that attaches said lightweight steel header to the lightweight steel stud.

8. The method according to claim 2 wherein the second structural frame member is a wood girder and the method for attaching said lightweight steel roof truss to the wood girder includes the further steps of:

a) positioning said lightweight steel roof truss to abut said at least one connection end against a first side of said wood girder; and b) driving at least one fastener into a second side of the wood girder opposite said first side, said at least one fastener being driven through the wood girder directly into said web member positioned adjacent the first side, said at least one fastener providing an end fastened connection that attaches said lightweight steel roof truss to the wood girder.

9. The method according to claim 4 wherein the second structural frame member is a wood girder and the method for attaching said lightweight steel floor truss to the wood girder includes the further steps of:

a) positioning said lightweight steel floor truss to abut said at least one connection end against a first side of said wood girder; and b) driving at least one fastener into a second side of the wood girder opposite said first side, said at least one fastener being driven through the wood girder directly into said web member positioned adjacent the first side, said at least one fastener providing an end fastened connection that attaches said lightweight steel floor truss to the wood girder.

10. The method according to claim 6 wherein the support member is a wood stud and the method for attaching said lightweight steel header to the wood stud includes the further steps of:

a) positioning said lightweight steel header to abut said at least one connection end against a first side of said wood stud; and b) driving at least one fastener into a second side of the wood stud opposite said first side, said at least one fastener being driven through the wood stud directly into said web member positioned adjacent the first side, said at least one fastener providing an end fastened connection that attaches said lightweight steel header to the wood stud.

11. A lightweight steel frame system having end fastened connections that attach lightweight steel structural frame members to second structural frame members, the end nailed fastened connections comprising:

a) at least one second structural frame member;

b) at least one lightweight steel structural frame member having a top chord, a bottom chord, and at least one connection end, said at least one connection end including a web member that extends between said top chord and said bottom chord, said at least one connection end positioned to abut against said at least one second structural frame member; and c) at least one fastener that extends through said second structural frame member directly into said web member to provide said end fastened connection that attaches said at least one lightweight steel structural frame member to said at least one second structural frame member so that said second structural frame member supports said lightweight steel structural frame member.

12. The invention recited in claim 11 wherein said at least one second structural frame member is a lightweight steel girder comprising:

a) a chord member having;
   i) spaced apart legs extending along a length of the chord member, and
   ii) at least one spacer positioned between the spaced apart legs at a location opposite said at least one connection end positioned against one of the spaced apart legs; and b) at least one fastener that extends through said spaced apart legs, through said at least one spacer, and directly into said web member, to provide said end fastened connection that attaches said at least one lightweight steel structural frame member to said lightweight steel girder.

13. The invention recited in claim 11 wherein the lightweight steel structural frame member is a roof truss and the second structural frame member is a girder.

14. The invention recited in claim 13 wherein the girder is a lightweight steel girder comprising:

a) a bottom chord member having;
   i) spaced apart legs extending along a length of the chord, and
   ii) at least one spacer positioned between the spaced apart legs at a location opposite said connection end positioned against one of the spaced apart legs; and b) at least one fastener that extends through the spaced apart legs, through said at least one spacer, and directly into said web member to provide said end fastened connection that attaches said roof truss to said lightweight steel girder.

15. The invention recited in claim 13 wherein the lightweight steel girder comprises:

a) a leveling member attached to at least one of the spaced apart legs, said leveling member extending in an outward direction from the lightweight steel girder along a length thereof, said leveling member positioned to receive said at least one connection end of the roof truss at a predetermined elevation set point prior to making said end fastened connection.

16. The invention recited in claim 13 wherein the lightweight steel girder comprises:

a) a leg extension attached to at least one of the spaced apart legs extending along the bottom chord, said leg extension providing an increased leg depth at said end fastened connection.

17. The invention recited in claim 11 wherein said at least one second structural frame member is a rolled shape comprising a lightweight steel girder including:

a) a horizontal segment having a hemmed edge;

b) a first leg extending in an upward direction from said horizontal segment; and c) a connection leg extending in an upward direction from said horizontal segment at a position between said first leg and said hemmed edge, said connection leg having a depth greater than a depth of said first leg.

18. The invention recited in claim 17 wherein said hemmed edge is positioned to receive said at least one connection end of said at least one lightweight structural member at a predetermined elevation set point.

19. The invention recited in claim 17 wherein said connection leg includes:

a) at least two vertically juxtaposed segments extending along the length of said connection leg and comprising;
   i) a first segment positioned to engage web members of the lightweight steel girder, and
   ii) a second segment offset from said first segment.

20. The invention recited in claim 11 wherein the lightweight steel structural frame member is a floor truss and the second structural frame member is a girder.

21. The invention recited in claim 20 wherein the girder is a lightweight steel girder comprising:

a) a chord member having;
   i) spaced apart legs extending along a length of the chord member, and
   ii) at least one spacer positioned between the spaced apart legs at a location opposite said connection end positioned against one of the spaced apart legs; and
b) at least one fastener that extends through the spaced apart legs, through said at least one spacer, and directly into said web member to provide said end fastened connection that attaches said floor truss to said lightweight steel girder.

22. The invention recited in claim 11 wherein the lightweight frame steel structural member is a header and the second structural frame member is a stud.

* * * * *